UNITED STATES PATENT OFFICE.

JOHN FIRMBACH, OF BROOKLYN, NEW YORK, ASSIGNOR OF ONE-HALF OF HIS RIGHT TO JAMES S. GARDNER, OF SAME PLACE.

GLUE CEMENT.

SPECIFICATION forming part of Letters Patent No. 225,119, dated March 2, 1880.

Application filed June 13, 1879.

*To all whom it may concern:*

Be it known that I, JOHN FIRMBACH, of the city of Brooklyn, county of Kings, and State of New York, have invented a new and useful Cement compounded to be used in a process of sealing barrels and other packages, so that leakage and evaporation of fluids are prevented; and I declare the following to be a true specification thereof.

The cement compound is made as follows: Take, in the proportions following, glue, one pound; bichromate of potash, two and one-half ounces, and of permanganate of potassium, one-quarter of an ounce.

First, soak the glue in cold water until soft, then throw it into scalding water until it becomes a liquid of the consistency of molasses; second, dissolve the bichromate of potash in hot water until the water is completely saturated; third, dissolve the permanganate of potassium in four pounds of hot water. Mix the two latter solutions, and while all are hot stir this mixture rapidly and thoroughly into the glue.

The mixture, when made, will, when cold, harden to the consistency of raw rubber, and must be kept from the sunlight until wanted for use. When used it must be heated to a fluid state, and if the vessel be a closed one, the vessel should be first heated by hot air, and the cement should be introduced through the bung or other aperture, and then by rapid manipulation, rotary or reciprocal, on various axes, it will be spread over entire interior surface. The package must then be placed in such a position that the rays of the sun may enter the aperture. In one hour the package will be sealed with a cement of great hardness, impervious to water or vapor, and incapable of capillary action. The aperture, when closed by the bung or stop, can then readily be sealed on the outside by applying the cement and exposing it to the sun's rays.

The cement will resist the passage of water, spirits, oils, all volatile spirits, such as alcohol and products of petroleum, and many others of like character.

The proportions given may be varied in some degree, although I prefer the proportions stated, and any matter of like character with glue may be substituted for it.

The use of a compound of glue and bichromate of potash is shown in patent to H. Wurtz, January 1, 1867, No. 60,984; but the compound as described in said patent is not, in fact, insoluble, nor is it capable of use as a cement. I do not claim such a compound.

In practical use, in many cases, a cement compound made of glue and bichromate of potash simply is soluble, to such an extent, at least, as to seriously affect its value as a cement in such cases; but the addition of the permanganate of potassium does make such a compound insoluble and indestructible practically, except by powerful acids.

In effect, also, its addition greatly quickens the coagulation of the compound and its rapid drying after application, and it also greatly increases the hardness of the compound.

What I claim to be new, and desire to secure by Letters Patent, is—

A cement compound of glue, bichromate of potash, and permanganate of potassium, in substantially the proportions stated.

JOHN FIRMBACH.

Witnesses:
E. B. BARNUM,
FRED. W. REBHANN.